(12) United States Patent
Furuta et al.

(10) Patent No.: US 7,565,901 B2
(45) Date of Patent: Jul. 28, 2009

(54) EGR SYSTEM FOR INTERNAL COMBUSTION ENGINE

(75) Inventors: Katsuhiro Furuta, Okazaki (JP); Daisuke Chino, Okazaki (JP); Kenji Saito, Nagoya (JP); Hitoshi Kamura, Okazaki (JP); Akihiro Iwama, Okazaki (JP); Akira Tsunooka, Kariya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/068,721

(22) Filed: Feb. 11, 2008

(65) Prior Publication Data
US 2008/0202482 A1 Aug. 28, 2008

(30) Foreign Application Priority Data
Feb. 27, 2007 (JP) ............... 2007-046899

(51) Int. Cl.
F02M 25/07 (2006.01)
F02B 47/08 (2006.01)
G01M 19/00 (2006.01)

(52) U.S. Cl. ............... 123/568.16; 73/114.74
(58) Field of Classification Search ............ 123/568.11, 123/568.16, 325, 481, 493, 198 DB, 198 F; 73/114.74; 701/108
See application file for complete search history.

(56) References Cited

U.S. PATENT DOCUMENTS

| 5,309,887 | A | * | 5/1994 | Kondo et al. | ............ | 123/568.16 |
|---|---|---|---|---|---|---|
| 5,337,725 | A | * | 8/1994 | Narita | ............ | 123/568.16 |
| 5,488,938 | A | * | 2/1996 | Ohuchi | ............ | 123/568.16 |
| 5,540,091 | A | * | 7/1996 | Nakagawa | ............ | 73/114.74 |
| 5,675,080 | A | * | 10/1997 | Wada | ............ | 73/114.74 |
| 6,609,059 | B2 | * | 8/2003 | Kawaguchi et al. | .... | 123/568.16 |
| 6,904,792 | B2 | * | 6/2005 | Wakahara | ............ | 73/114.74 |
| 6,941,936 | B2 | * | 9/2005 | Yasui et al. | ............ | 123/674 |
| 7,275,525 | B2 | * | 10/2007 | Miyasako et al. | ...... | 123/568.16 |

FOREIGN PATENT DOCUMENTS

| JP | 2-75748 | A | | 3/1990 | | |
|---|---|---|---|---|---|---|
| JP | 08158956 | A | * | 6/1996 | ............ | 73/114.74 |

* cited by examiner

Primary Examiner—Willis R Wolfe, Jr.
(74) Attorney, Agent, or Firm—Birch, Stewart, Kolasch & Birch, LLP

(57) ABSTRACT

When the opening angle of an intake control valve is limited to a given opening angle by fuel cut, an EGR apparatus is activated, and a malfunction of the EGR apparatus is diagnosed on the basis of a change in intake manifold pressure before and after the activation of the EGR apparatus. When the control for reducing the intake-manifold negative pressure is not implemented, the change of the intake manifold pressure is corrected with a changing amount of first reference intake pressure (P(Ne)) changed by engine speed Ne. When the control for reducing the intake manifold genitive pressure is implemented, the change of the intake manifold pressure is corrected with a changing amount of second reference intake pressure ($P_L$(Ne)) changed by engine speed Ne.

5 Claims, 7 Drawing Sheets

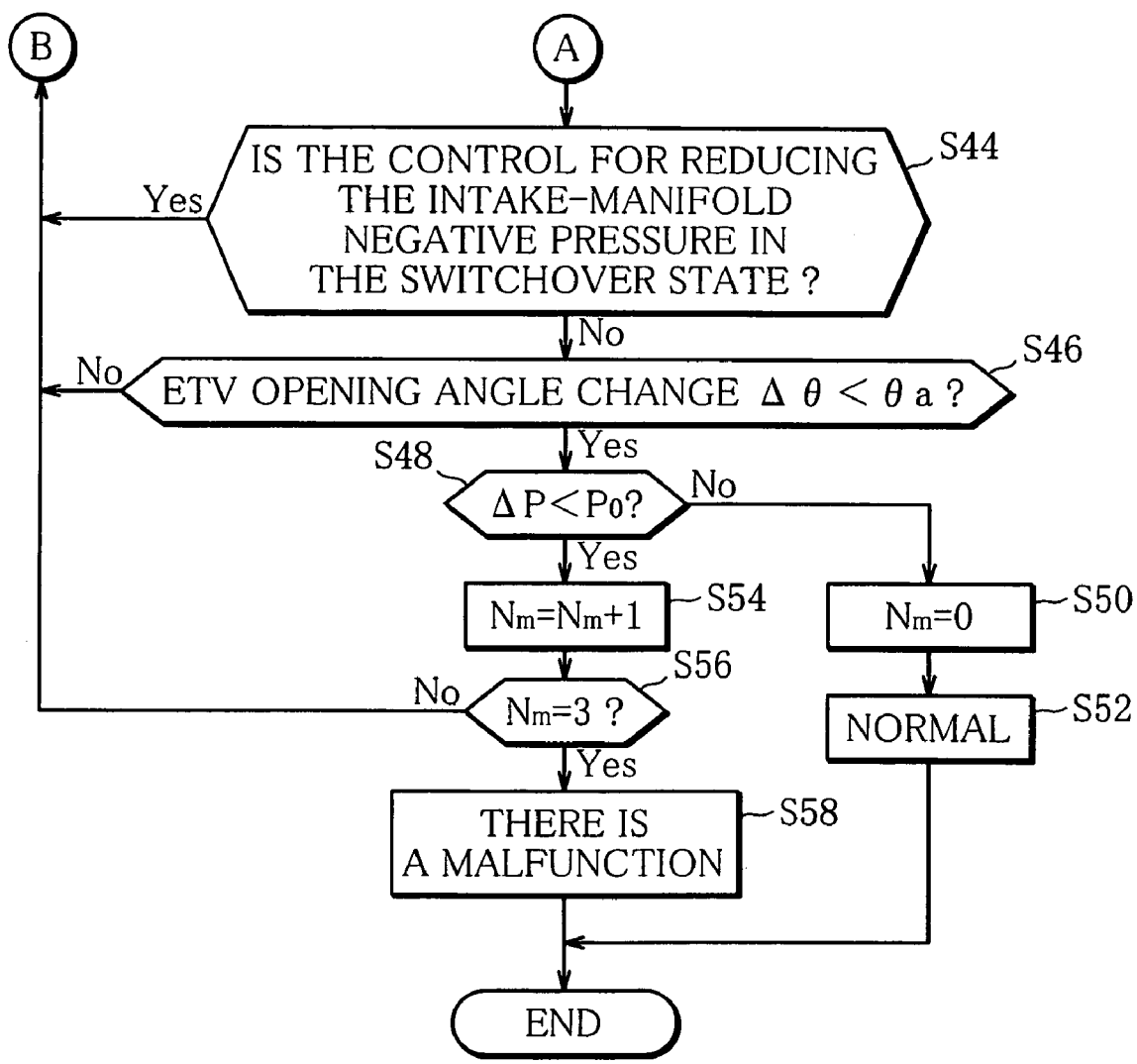

EGR SYSTEM FOR INTERNAL COMBUSTION ENGINE

BACKGROUND OF THE INVENTION

1. Field of the Invention

The present invention relates to an EGR system for an internal combustion engine, and more specifically, to a technology of diagnosing a malfunction of an EGR apparatus.

2. Description of the Related Art

A well-known EGR apparatus (exhaust gas recirculation system) prevents the generation of NOx (nitrogen oxide) by circulating a portion of exhaust gas, which is discharged from an internal combustion engine, through an exhaust path to an intake path as EGR gas (exhaust gas recirculation gas), and then reducing the combustion temperature.

The EGR apparatus is generally formed of an EGR passage connecting the exhaust path to the intake path and an EGR valve for controlling the passage sectional area of the EGR passage. The EGR apparatus controls the flow rate of EGR gas by adjusting the opening angle of the EGR valve according to the operation state of the internal combustion engine.

Because the EGR gas is a high-temperature gas that contains various exhaust gas components, the EGR valve is placed in a high temperature environment and might get broken or fail to operate properly. If the EGR valve has a malfunction or other troubles, the flow rate of the EGR gas cannot be properly controlled. This makes it impossible to prevent the generation of NOx, and moreover could incur abnormal combustion of the internal combustion engine.

For this reason, various technologies of diagnosing a malfunction of the EGR apparatus have been developed. For instance, there is a well-known system having a structure in which, when placed in an internal combustion engine that is installed in a vehicle and capable of activating a fuel cut during vehicle deceleration, the system completely closes a throttle valve while opening an EGR valve during fuel cut, and decides that the EGR apparatus has a malfunction if the intake manifold pressure hardly changes before and after the opening operation of the EGR valve (Unexamined Japanese Patent Publication No. 2-75748).

The above structure reduces an impact on the output of the engine and makes it possible to diagnose a malfunction of the EGR apparatus without deteriorating drivability.

Engine speed is decreased during the vehicle deceleration, whereas the intake manifold pressure is increased in proportion to the decrease of the engine speed. The technology described in the above publication has not been developed in consideration of the amount of a spontaneous change in the intake manifold pressure, and therefore is not capable of performing a malfunction diagnosis with accuracy.

The complete closing of the throttle valve during fuel cut raises the intake manifold pressure and therefore the cylinder pressure in the intake stroke of the engine toward a negative pressure side. This incurs an oil leak into the combustion chamber from a gap between a piston and a cylinder, thereby increasing oil consumption and adversely affecting gas emissions. In light of these problems, another system has lately been developed, which implements negative pressure reducing control during fuel cut. To be concrete, in a high engine speed region where cylinder negative pressure is increased, an electric throttle valve is used so that the throttle valve may be controlled to be opened at a minute opening angle rather than be totally closed, or an idle speed controller is controlled to a slightly open side. By so doing, the intake manifold pressure is controlled to an ambient pressure side. Consequently, oil is prevented from leaking into the combustion chamber.

If the negative pressure reducing control is carried out as described above, the throttle valve and the idle speed controller are operated, and therefore, the intake manifold pressure is different from the case where the negative pressure reducing control is not performed. Even if the amount of the spontaneous change of the intake manifold pressure is taken into account, it is impossible to directly apply the amount of the spontaneous change that is caused when the negative pressure reducing control is not performed. For this reason, the technology described in the publication does not achieve an accurate diagnosis for a malfunction of the EGR apparatus.

In this case, for example, it is possible not to diagnose a malfunction of the EGR apparatus as to the high engine speed region where the negative pressure reducing control is performed. However, this limits the malfunction diagnosis to be performed only when the engine speed is low, which is undesirable because the diagnosis is drastically reduced in frequency, and the requirements of the OBD (On Board Diagnosis) system are not then fully satisfied.

SUMMARY OF THE INVENTION

The present invention has been made to solve the foregoing problems. It is an object of the invention to provide an EGR system for an internal combustion engine, which is capable of diagnosing a malfunction of an EGR apparatus with accuracy and maintaining the diagnostic accuracy at high level.

In order to accomplish the above-mentioned object, an EGR system for an internal combustion engine according to the invention has an intake control valve that is set in an intake path of an internal combustion engine and controls an intake air amount to be introduced into a cylinder by changing opening angle; an EGR apparatus having an EGR path that connects an exhaust path of the engine to an intake path located in an intake downstream from the intake control valve and circulates a portion of exhaust gas through the cylinder as EGR gas, and an EGR control valve for controlling a flow rate of EGR gas that flows through the EGR path; intake-pressure detecting means that detects intake pressure of the intake path located in the intake downstream from the intake control valve; fuel cut means that restricts the opening angle of the intake control valve to a given opening angle and stops fuel supply into the cylinder when the engine is in a deceleration state; engine-speed detecting means that detects engine speed; reduction control means that reduces the opening angle restriction on the intake control valve according to the engine speed that is detected by the engine-speed detecting means so that the intake pressure of the intake path located in the intake downstream from the intake control valve is not lower than given pressure when the opening angle of the intake control valve is restricted to the given opening angle by the fuel cut means; and EGR-malfunction diagnosing means that activate the EGR apparatus to circulate the EGR gas when the opening angle of the intake control valve is restricted to the given opening angle by the fuel cut means, and diagnoses a malfunction of the EGR apparatus according to whether or not the reduction control means is activated, based upon a change in intake pressure before and after the activation of the EGR apparatus, which is detected by the intake-pressure detecting means, and reference intake pressure that is determined in two ways, depending upon whether or not the reduction control means is activated.

According to the invention, by using the reference intake pressure that is determined in two ways, depending upon whether or not the reduction control means is activated, a malfunction of the EGR apparatus can be diagnosed according to whether or not the reduction control means is activated. Since the malfunction diagnosis of the EGR apparatus can be conducted during fuel cut, regardless of whether the reduction control of the opening angle restriction of the intake control valve is implemented, the malfunction diagnosis can be maintained high in accuracy.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2B is the rest of the flowchart showing a control routine of malfunction diagnosis of the EGR apparatus in the EGR system for an internal combustion engine according to the invention;

DETAILED DESCRIPTION OF THE PREFERRED EMBODIMENTS

An embodiment of the invention will be described below with reference to the attached drawings.

Figure 1:
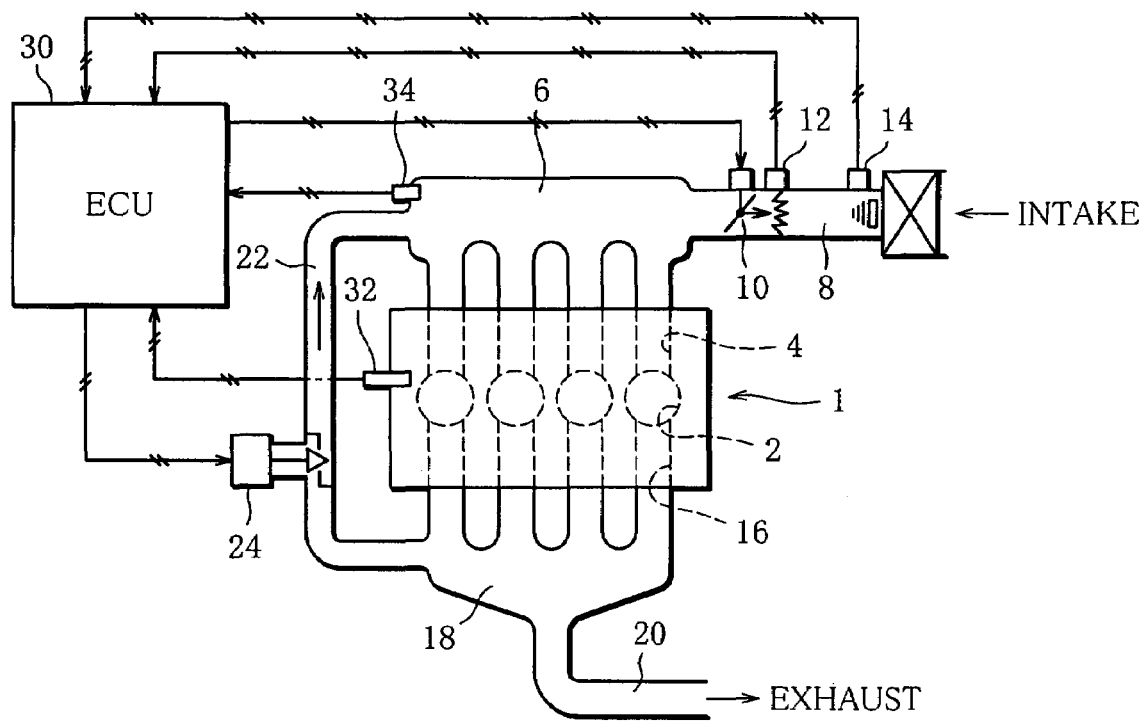
FIG. 1 is a configuration view of an EGR system for an internal combustion engine according to the present invention, which is installed in a vehicle.

FIG. 1 is a configuration view of an EGR system for an internal combustion engine according to the invention, which is installed in a vehicle.

As illustrated in FIG. 1, for example, an in-line four cylinder gasoline engine is applied as an engine 1 that is an internal combustion engine. An intake port 4 communicating with each of cylinders 2 of the engine 1 is connected with an intake pipe 8 with an intake manifold 6 interposed therebetween.

The intake pipe 8 is provided with an electromagnetic throttle valve (ETV) (intake control valve) 10 that controls an intake amount. A throttle position sensor (TPS) (means for detecting the opening angle of the intake control valve) 12 that detects the opening angle of the ETV 10, namely a throttle opening angle (throttle position), is situated near the ETV 10. An airflow sensor (AFS) 14 that detects an intake air amount is interposed in the intake pipe 8 to be located in the intake upstream from the ETV 10.

An exhaust port 16 communicating with each of the cylinders 2 of the engine 1 is connected with an exhaust pipe 20 with an exhaust manifold 18 interposed therebetween.

The intake manifold 6 and the exhaust manifold 18 are connected to each other through an EGR path 22. An electromagnetic EGR valve 24 is interposed in the EGR path 22 (EGR apparatus). According to the operation state of the engine 1, a portion of exhaust gas in the exhaust manifold 18 can be circulated as EGR gas (exhaust gas recirculation gas) to the intake manifold 6 and therefore to the cylinders 2 according to the opening angle of the EGR valve 24. Consequently, it is possible to slow the fuel combustion in the cylinders 2 of the engine 1 and reduce combustion temperature, to thereby prevent NOx from being produced.

An ECU (electrical control unit) 30 is constructed to control the engine 1 and the like, and includes an input/output device, a storage device (ROM, RAM, nonvolatile RAM, etc.), a central processing unit (CPU), etc.

Not only the TPS 12 and the AFS 14 but also various kinds of sensors are connected to an input side of the ECU 30, including an engine speed sensor (engine-speed detecting means) 32 that detects the engine speed Ne, an intake pressure sensor (intake-pressure detecting means) 34 that detects the intake pressure (intake manifold pressure) in the intake manifold 6, an acceleration sensor (APS), not shown, which detects an operation amount of an acceleration pedal, and the like. Detection information from these sensors is inputted to the ECU 30.

Connected to an output side of the ECU 30 are not only the ETV 10 and the EGR valve 24 but also various kinds of output devices including a fuel injection valve, an ignition coil, etc., not shown. A signal calculated in the ECU 30 based upon the detection information from the sensors, which includes, for example, fuel injection amount, fuel injection timing, ignition timing and the like, is outputted to the above output devices. In other words, the ETV 10 is opened or closed at proper opening angle with proper timing, and a proper amount of fuel is injected with proper timing. At the same time, spark ignition is carried out with proper timing. Based upon the engine speed Ne inputted from the engine speed sensor 32 and the intake air amount from the AFS 14, the EGR valve 24 is properly opened or closed.

The engine 1 is constructed so that the fuel supply may be stopped when the vehicle is in a deceleration state, and that a fuel cut may be activated with respect to all the cylinders (fuel cut means). More specifically, based upon a command from the ECU 30, the fuel injection from the fuel injection valve is stopped to properly activate a fuel cut in the engine 1 when the driver releases the accelerator, and the vehicle is in the deceleration state at the engine speed Ne equal to or more than given speed.

Since the fuel cut is activated in the middle of the deceleration, air suction for combustion is not required. Therefore, for example, in order to enhance an engine braking effect, the opening angle of the ETV 10 is restricted to the given opening angle simultaneously with the activation of the fuel cut, and the ETV 10 is brought into, for example, a totally closed position. In general, an idle speed controller, not shown, is disposed so as to bypass the ETV 10 so that the intake air amount may be adjusted to provide stable idling even if the ETV 10 is completely closed. Accordingly, air suction is allowed by the idle speed controller even when the ETV 10 is in the totally closed position.

The fuel cut is continued until the engine speed Ne is reduced to given low engine speed, and a given condition for fuel cut restoration is then satisfied.

If the fuel cut is activated, and the opening angle of the ETV 10 is restricted as described above, because of structural reasons of the engine 1, the intake manifold pressure in the intake manifold 6 and therefore the cylinder pressure is drastically decreased, and the negative pressure is increased. As a result, there generates an oil leak into the combustion chamber (hereinafter, referred to as "oil leak"), in which engine oil for lubrication is leaked from a gap between the cylinders and pistons into the cylinders. If such an oil leak occurs, oil consumption is increased with deterioration of a catalyst. The higher engine speed Ne produces the higher negative pressure, and makes the above problem prominent.

In this light, when the engine 1 runs at the given speed Ne0 or more, which is such a condition that the oil leak is likely to occur, the control for reducing the intake-manifold negative pressure is implemented according to a command of the ECU 30 to reduce the opening angle restriction of the ETV 10, to raise the intake manifold pressure in the intake manifold 6, and consequently, to reduce the cylinder negative pressure (reduction control means). More concretely, the control for reducing the intake-manifold negative pressure is started on the premise that the oil leak would occur when the engine speed Ne is the given speed Ne0 or more. The opening angle of the ETV 10 is controlled to an open side so that the negative pressure in the intake manifold 6 does not become lower than pressure at which the oil leak occurs. This makes it possible to activate the fuel cut and prevent the oil leak at the same time.

According to the EGR system for an internal combustion engine, in the case where the opening angle of the ETV 10 is restricted by activating the fuel cut, the malfunction diagnosis of the EGR apparatus is conducted using the ECU 30 (EGR-malfunction diagnosing means).

Figure 2A:
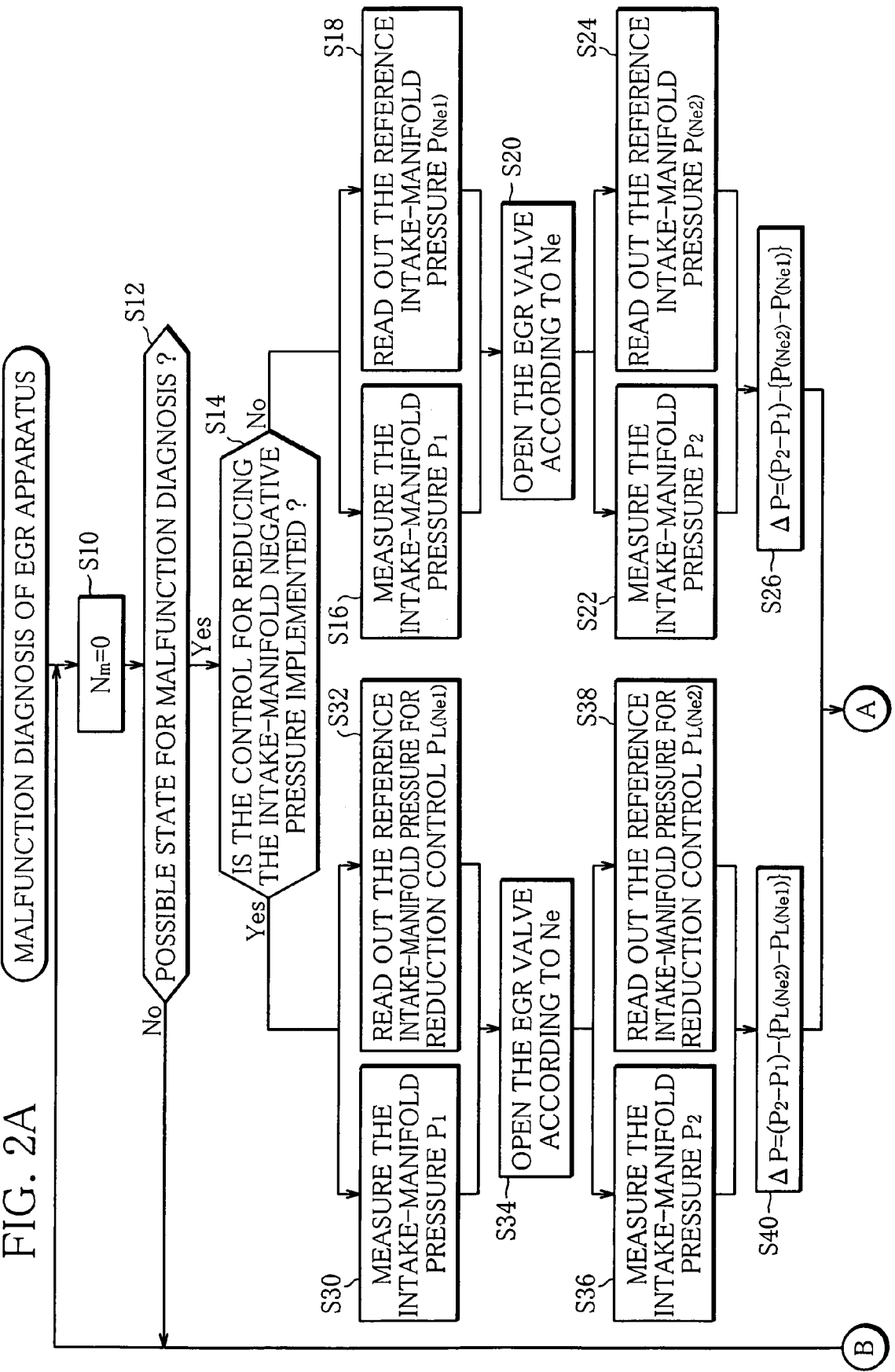
FIG. 2A is a part of a flowchart showing a control routine of malfunction diagnosis of the EGR apparatus in the EGR system for an internal combustion engine according to the invention.

FIGS. 2A, 2B give a flowchart showing a control routine of malfunction diagnosis of the EGR apparatus in the EGR system for: an internal combustion engine according to the invention, which is carried out by the ECU 30. A procedure of the malfunction diagnosis of the EGR apparatus according to the invention will be described below with reference to the flowchart.

First in Step S10, an after-mentioned counter Nm for malfunction judgment is reset to zero.

Step S12 makes a determination as to whether the condition allows to perform the malfunction diagnosis. In other words, as described above, it is determined whether the fuel cut is activated as preparatory for the diagnosis. If the judgment result is "NO," and the fuel cut has not been activated, the routine returns to Step S10. If the result is "YES," and the fuel cut is in progress, the routine advances to Step S14.

Step S14 makes a determination as to whether or not the control for reducing the intake-manifold negative pressure is in progress or allowed to be implemented. More specifically, if the engine speed Ne is the given speed Ne0 or more during fuel cut, the control for reducing the intake-manifold negative pressure is implemented as described above. In this step, it is determined whether or not the engine speed Ne is the given speed Ne0 or more. The judgment result is "NO," and it is determined that the engine speed Ne is not the given speed Ne0 or more, and that the control for reducing the intake-manifold negative pressure is not implemented, the routine moves to Step S16.

In Step S16, current intake manifold pressure P1 is measured on the basis of information from the intake pressure sensor 34.

At the same time, Step S18 reads out reference intake manifold pressure P(Ne1). To be concrete, the reference intake manifold pressure P(Ne) in the case where the opening angle of the ETV 10 is restricted by fuel cut while the EGR valve 24 is not opened, and the control for reducing the intake-manifold negative pressure is not implemented (first reference intake pressure), is preset on the basis of experiments or the like according to the engine speed Ne and stored in the ECU 30 as a map. In this step, the reference intake manifold pressure P(Ne1) corresponding to current engine speed Ne1 is read out from the map shown in FIG. 3.

Figure 3:
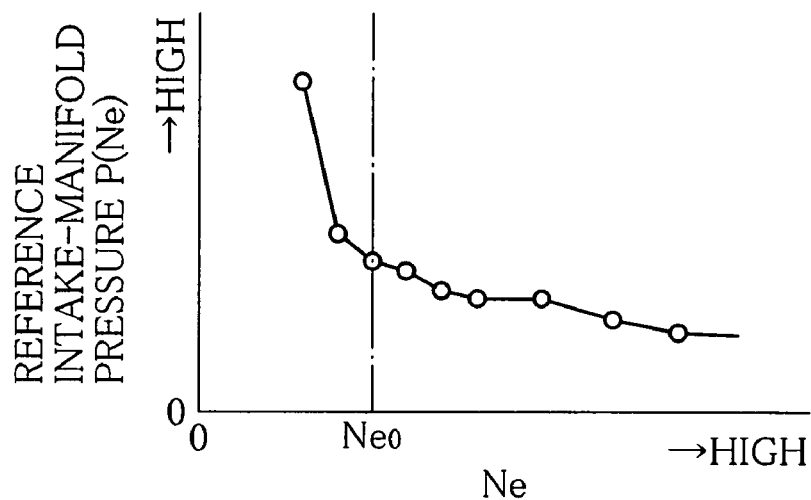
FIG. 3 is a map of reference intake manifold pressure P(Ne) in the case where control for reducing intake-manifold negative pressure is not implemented.

According to the map of FIG. 3, if the control for reducing the intake-manifold negative pressure is not implemented, as the increase of the engine speed Ne is increased, the intake manifold pressure becomes low while the negative pressure grows high. However, the given speed Ne0 is considered as a lower limit at which the oil leak occurs as mentioned above. The map of FIG. 3 is applied to a region where the engine speed Ne is the given speed Ne0 or less, and in this region, the oil leak does not occur.

In Step S20, the EGR valve 24 is opened to allow the circulation of the EGR gas. More concretely, the EGR valve 24 is opened according to the engine speed Ne.

The reason why the EGR valve 24 is opened according to the engine speed Ne is that the malfunction diagnosis of the EGR apparatus is conducted on the basis of a degree of an intake-manifold-pressure changing amount $\Delta P$ before and after the opening of the EGR valve 24 as described below, and the intake-manifold-pressure changing amount $\Delta P$ is determined by the opening angle of the EGR valve 24 and the engine speed Ne.

Figure 4:
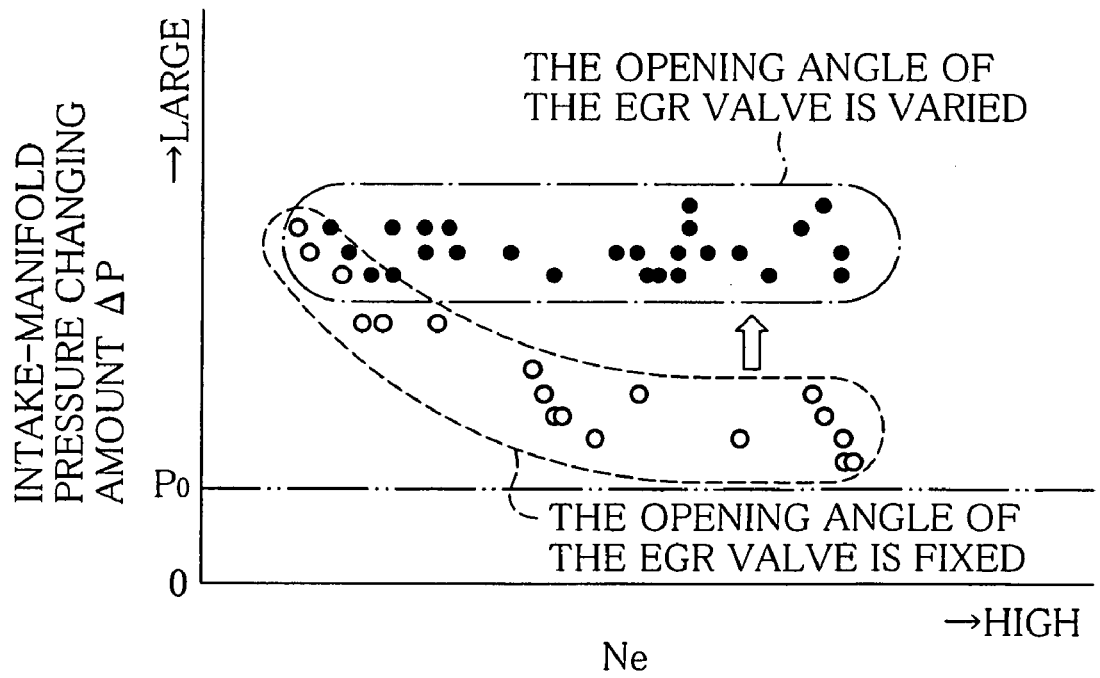
FIG. 4 shows relationship between engine speed Ne and an intake-manifold-pressure changing amount $\Delta P$ corresponding to the opening angle of an EGR valve.

FIG. 4 shows the relationship between the engine speed Ne and the intake-manifold-pressure changing amount $\Delta P$ in comparison between the case where the opening angle of the EGR valve 24 is changed according to the engine speed Ne (shown by marks "●" collectively enclosed by a dashed line) and the case where the opening angle of the EGR valve 24 is fixed in the restricted state (shown by marks "○" collectively enclosed by a broken line). FIG. 4 also shows a threshold value P0 for malfunction judgment. As illustrated in FIG. 4, if the opening angle of the EGR valve 24 is fixed in the restricted state, the intake-manifold-pressure changing amount $\Delta P$ usually tends to be decreased with the increase of the engine speed Ne even if there is no malfunction in the EGR apparatus. The intake-manifold-pressure changing amount $\Delta P$ then approximates to the threshold value P0, which brings about the possibility of an erroneous judgment. If the opening angle of the EGR valve 24 is changed according to the engine speed Ne, the intake-manifold-pressure changing amount $\Delta P$ can be maintained to be substantially fixed, which enhances the detection of the intake-manifold-pressure changing amount. It is then possible to satisfactorily prevent an erroneous judgment of the malfunction diagnosis.

Figure 5:
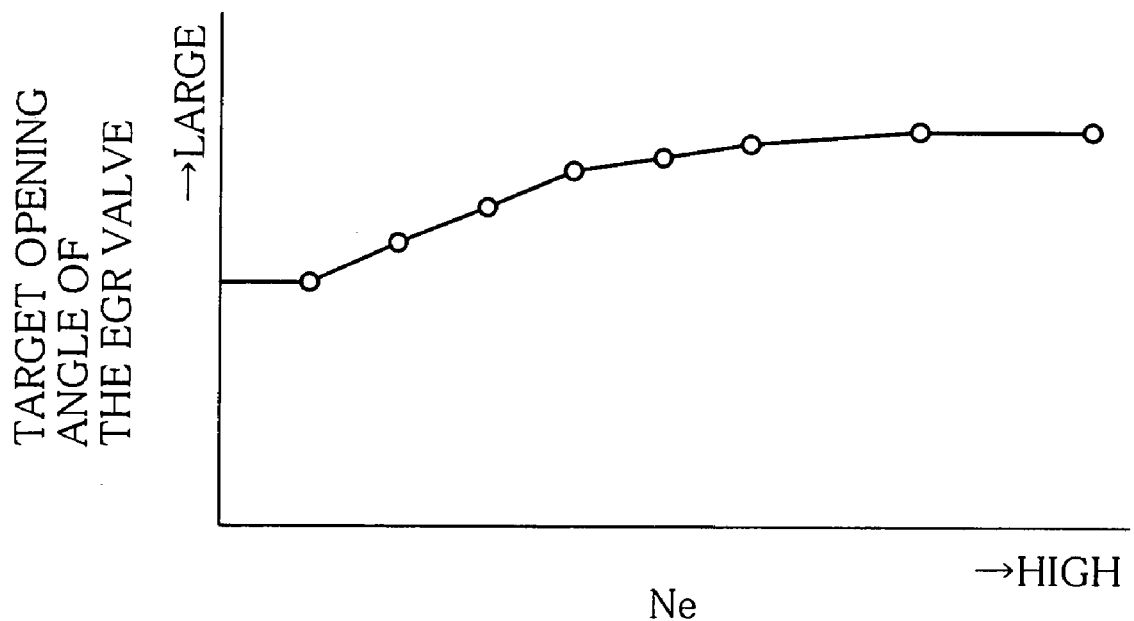
FIG. 5 shows relationship between the engine speed Ne and target opening angle of the EGR valve.

As illustrated in FIG. 5, target opening angle is determined so that the opening angle of the EGR valve 24 grows larger with the increase of the engine speed Ne. The EGR valve 24 is opened to reach the target opening angle. Consequently, the intake-manifold-pressure changing amount $\Delta P$ can be maintained to be large and substantially fixed, which makes it possible to make the malfunction judgment with accuracy.

Step S22 measures an intake manifold pressure P2 on the basis of information from the intake pressure sensor 34 after the EGR valve 24 is opened to reach the target opening angle.

Simultaneously with Step S22, Step S24 reads out reference intake manifold pressure P(Ne2) corresponding to current engine speed Ne2 from the map of FIG. 3 in the same manner as described.

After the intake manifold pressures P1 and P2 before and after the opening of the EGR valve 24 are measured, and the reference intake manifold pressures P(Ne1) and P(Ne2) at the respective time points are obtained, the routine advances to Step S26.

In Step S26, the intake-manifold-pressure changing amount ΔP is calculated by the following formula (1).

$$\Delta P = (P2-P1) - \{P(Ne2) - P(Ne1)\} \quad (1)$$

where (P2−P1) is a changing amount of actual intake manifold pressure, which is a result of the opening of the EGR valve 24. {P(Ne2)−P(Ne1)} is the changing amounts of the reference intake manifold pressures P(Ne) that are changed within the period when the intake manifold pressures P1 and P2 are measured.

In other words, through the formula (1), a correction is performed by deducting an amount of a spontaneous change in the intake manifold pressure that spontaneously changes according to the engine speed Ne from the changing amount of the actual intake manifold pressure, to thereby accurately obtain the changing amount of the intake manifold pressure, which results from the opening of the EGR valve 24. This makes it possible to make a malfunction diagnosis of the EGR apparatus with accuracy.

When the judgment result of Step S14 is "YES", and it is then determined that the engine speed Ne is the given speed Ne0 or more, and that the control for reducing the intake-manifold negative pressure is implemented, the routine moves to Step S30.

Step S30 measures the current intake manifold pressure P1 on the basis of information from the intake pressure sensor 34 in the same manner as described.

Figure 6:
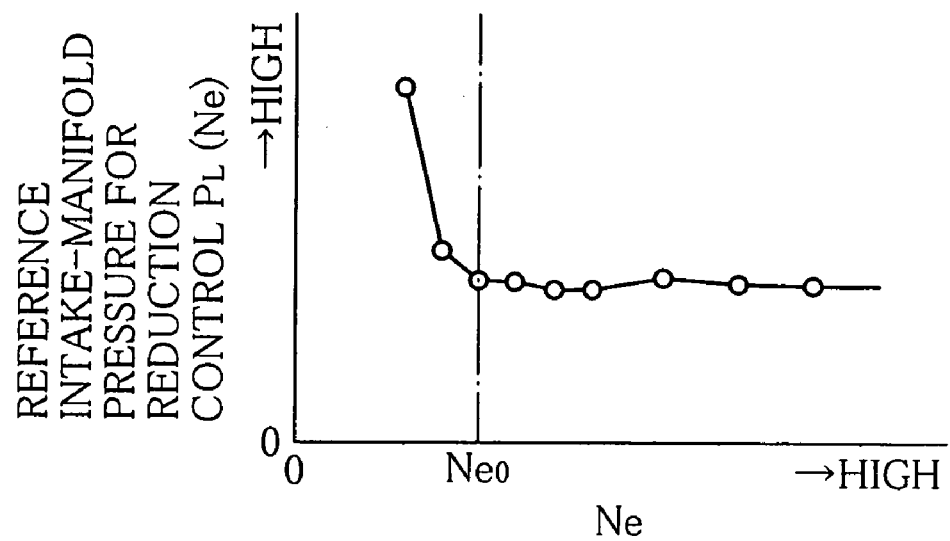
FIG. 6 is a map of reference intake manifold pressure $P_L(Ne)$ for reduction control in the case where the control for reducing intake-manifold negative pressure is carried out.

Simultaneously with Step S30, Step S32 reads out reference intake manifold pressure for reduction control $P_L$(Ne1). More specifically, the reference intake manifold pressure for reduction control $P_L$(Ne) in the case where the control for reducing the intake-manifold negative pressure is implemented without opening the EGR valve 24 during fuel cut (second reference intake pressure) as shown in FIG. 6 is preset on the basis of experiments or the like according to the engine speed Ne as in FIG. 3 and is stored in the ECU 30 as a map. In this step, the reference intake manifold pressure for reduction control $P_L$(Ne1) corresponding to the current engine speed Ne1 is read out from a map shown in FIG. 6.

As described above, the control for reducing the intake-manifold negative pressure controls the opening angle of the ETV 10 to the open side so that the intake manifold pressure does not exceed the given negative pressure at which the oil leak occurs (that is, the intake manifold pressure is not reduced lower than the given pressure) when the engine speed Ne is the given speed Ne0 or more. Accordingly, as shown in the map of FIG. 6, the reference intake manifold pressure for reduction control $P_L$(Ne) is maintained to be substantially fixed so as not to exceed the given negative pressure (not to be reduced lower than the given pressure). Therefore, the oil leak does not occur even in the region where the engine speed Ne is the given speed Ne0 or more.

In Step S34, as shown in FIG. 5, the target opening angle is set so that the opening angle of the EGR valve 24 grows larger with the increase of the engine speed Ne. The EGR valve 24 is then opened to reach the target opening angle. Consequently, the intake-manifold-pressure changing amount ΔP can be maintained to be large and substantially fixed. It is therefore possible to make the malfunction judgment with accuracy.

In Step S36, the intake manifold pressure P2 is measured again on the basis of information from the intake pressure sensor 34 after the EGR valve 24 is opened to reach the target opening angle.

Simultaneously with Step S36, Step S38 reads out reference intake manifold pressure $P_L$(Ne2) corresponding to the current engine speed Ne2 from the map of FIG. 6 in the same manner as described.

After the intake manifold pressures P1 and P2 before and after the opening of the EGR valve 24 are measured, and the reference intake manifold pressures for reduction control $P_L$(Ne1) and $P_L$(Ne2) at the respective time points are obtained, the routine advances to Step S40.

In Step S40, the intake-manifold-pressure changing amount ΔP is calculated by the following formula (2).

$$\Delta P = (P2-P1) - \{P_L(Ne2) - P_L(Ne1)\} \quad (2)$$

where (P2−P1) is a changing amount of the actual intake manifold pressure as in the formula (1), which is a result of the opening of the EGR valve 24. {$P_L$(Ne2)−$P_L$(Ne1)} is the changing amounts of the reference intake manifold pressures for reduction control $P_L$(Ne) which are changed within the period when the intake manifold pressures P1 and P2 are measured.

Consequently, even if the control for reducing the intake-manifold negative pressure is implemented, a correction is performed by deducting the amount of the spontaneous change in the intake manifold pressure that spontaneously changes according to the engine speed Ne from the changing amount of the actual intake manifold pressure, to thereby accurately obtain the changing amount of the intake manifold pressure, which results from the opening of the EGR valve 24. This makes it possible to carry out the malfunction diagnosis of the EGR apparatus with accuracy.

After the intake-manifold-pressure changing amount ΔP is calculated in Step S26 or S40, the routine advances to Step S44.

Step S44 makes a determination as to whether the control for reducing the intake-manifold negative pressure is in a switchover state. In this step, it is detected, for example, by whether or not the engine speed Ne exceeds the given speed Ne0. If the judgment result is "YES", and the control for reducing the intake-manifold negative pressure is considered to be in the switchover state, it is determined that the condition is a transient state where the control for reducing the intake-manifold negative pressure is finished, and the opening angle of the ETV 10 is greatly changed. If the opening angle of the ETV 10 is drastically changed, the intake manifold pressure becomes unstable. In this case, the subsequent malfunction judgment is not carried out, and the routine returns to Step S10. This prevents an erroneous judgment of the malfunction diagnosis and makes it possible to perform an accurate malfunction diagnosis of the EGR apparatus. If the judgment result is "NO", and it is determined that the control for reducing the intake-manifold negative pressure is not in the switchover state, the routine moves to Step S46.

Step S46 makes a determination as to whether opening angle changing amount Δθ of the ETV 10 is smaller than given amount θa. In short, it is determined in this step whether the ETV 10 is highly changed for some reason.

If the control for reducing the intake-manifold negative pressure is not implemented, and the opening angle of the ETV 10 is merely restricted, the opening angle θ of the ETV 10 should not be primarily changed. Therefore, the opening angle changing amount Δθ of the ETV 10 is calculated by the following formula (3), and a determination is made as to whether the opening angle changing amount Δθ is smaller than the given amount θa.

$$\Delta\theta = \theta max - \theta min \qquad (3)$$

where θmax and θmin are maximum and minimum opening angles, respectively, of the ETV 10 among the opening angles that have been detected by the TPS 12 so far from the beginning of the measurement of the intake manifold pressure P1 in Step S16.

However, when the control for reducing the intake-manifold negative pressure is implemented, the opening angle of the ETV 10 is primarily controlled to the open side, and it is natural that the opening angle θ of the ETV 10 is greatly changed in some cases. Therefore, the formula (3) is not useful in this case. For this reason, if the control for reducing the intake-manifold negative pressure is implemented, the opening angle changing amount Δθ of the ETV 10 is calculated by the following formula (4). It is then determined whether the opening angle changing amount Δθ is smaller than the given amount θa.

$$\Delta\theta = \{\theta - \theta s(Ne)\}max - \{\theta - \theta s(Ne)\}min \qquad (4)$$

where θs(Ne) is reference opening angle of the ETV 10 that is changed according to the engine speed Ne due to the control for reducing the intake-manifold negative pressure. The reference opening angle θs(Ne) is a value corresponding to the reference intake manifold pressure for reduction control $P_L$(Ne). {θ−θs(Ne)}max is a maximum value of difference between the opening angles θ that have been detected by the TPS 12 so far from the beginning of the measurement of the intake manifold pressure P1 in Step S30 and the respective reference opening angles θs(Ne). {θ−↓s(Ne)}min is a minimum value of difference between the opening angels θ detected by the TPS 12 and the respective reference opening angles θs(Ne).

Figure 7:
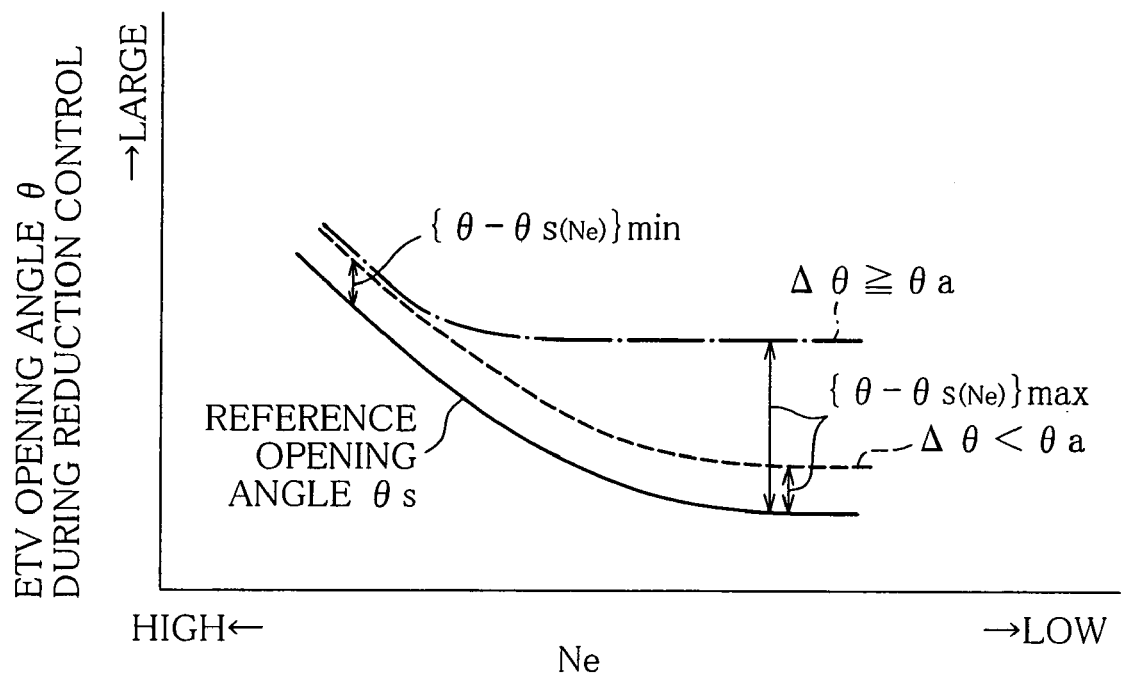
FIG. 7 shows relationship between the engine speed Ne being reduced and opening angle $\theta$ of an ETV during the control for reducing the intake-manifold negative pressure.

FIG. 7 shows a relationship between the engine speed Ne being reduced and the opening angle θ of the ETV 10 during the control for reducing the intake-manifold negative pressure. If the control for reducing the intake-manifold negative pressure is implemented, the difference between {θ−θs (Ne)}max and {θ−θs (Ne)}min corresponds to the opening angle changing amount Δθ of the ETV 10. Regardless of a change range of the opening angle θ detected by the TPS 12, it is determined whether the difference (Δθ) between {θ−θs(Ne)}max and {θ−θs(Ne)}min is smaller than the given amount θa.

If the judgment result of Step S46 is "NO," and it is determined that the opening angle changing amount Δθ of the ETV 10 is equal to or more than the given amount θa, the intake manifold pressure becomes unstable. Therefore, the malfunction judgment is not carried out, and the routine returns to Step S10. If the control for reducing the intake-manifold negative pressure is implemented, the routine returns to Step S10 when the difference (Δθ) between {θ−θs(Ne)}max and {θ−θs(Ne)}min is equal to or more than the given amount θa (shown by a dashed line) as illustrated in FIG. 7. This prevents an erroneous judgment in the malfunction diagnosis and makes it possible to perform an accurate malfunction diagnosis of the EGR apparatus.

If the judgment result is "YES," and the opening angle changing amount Δθ of the ETV 10 is smaller than the given amount θa, the malfunction judgment is continued, and the routine advances to Step S48. If the control for reducing the intake-manifold negative pressure is implemented, the routine advances to Step S48 when the difference (Δθ) between {θ−θs(Ne)}max and {θ−ηs(Ne)}min is smaller than the given amount θa (shown by a broken line) as illustrated in FIG. 7. This prevents a reduction in the opportunity to diagnose a malfunction of the EGR apparatus as much as possible, and the malfunction diagnosis of the EGR apparatus can be sufficiently carried out with high frequency.

Step S48 makes a determination as to whether the intake-manifold-pressure changing amount ΔP obtained in Step S26 or S40 is smaller than the threshold value P0 of the malfunction judgment. As shown in FIG. 4, the threshold value P0 is a value approximate to zero. If the judgment result is "NO," and the intake-manifold-pressure changing amount ΔP is equal to or more than the threshold value P0, the counter Nm is reset to zero in Step S50. It is then determined that the EGR apparatus is in a normal state in Step S52. If the judgment result is "YES," and the intake-manifold-pressure changing amount ΔP is smaller than the threshold value P0, that is, if the intake manifold pressure hardly changes, the routine moves to Step S54, which counts up the counter Nm. The routine then advances to Step S56.

Step S56 determines whether the counter Nm is 3. If the judgment result is "NO," and the counter Nm is 1 or 2, the routine returns to Step S10. Steps S12 to S54 are repeatedly carried out. If the judgment result is "YES," which means that the counter Nm is 3, the routine moves to Step S58, and the EGR apparatus is judged to have a malfunction.

Only if Step S48 determines, for the third time in a row, that the intake-manifold-pressure changing amount ΔP is smaller than the threshold value P0, the EGR apparatus is considered to have a malfunction. Otherwise, it is determined that the intake-manifold-pressure changing amount ΔP becomes smaller than the threshold value P0 by accident for some reason such as noises, and the malfunction diagnosis is repeated. This prevents an erroneous judgment in the malfunction diagnosis and makes it possible to perform an accurate malfunction diagnosis of the EGR apparatus.

As described above, the control routine regularly carries out the malfunction diagnosis of the EGR apparatus in given cycles during fuel cut.

Figure 8:
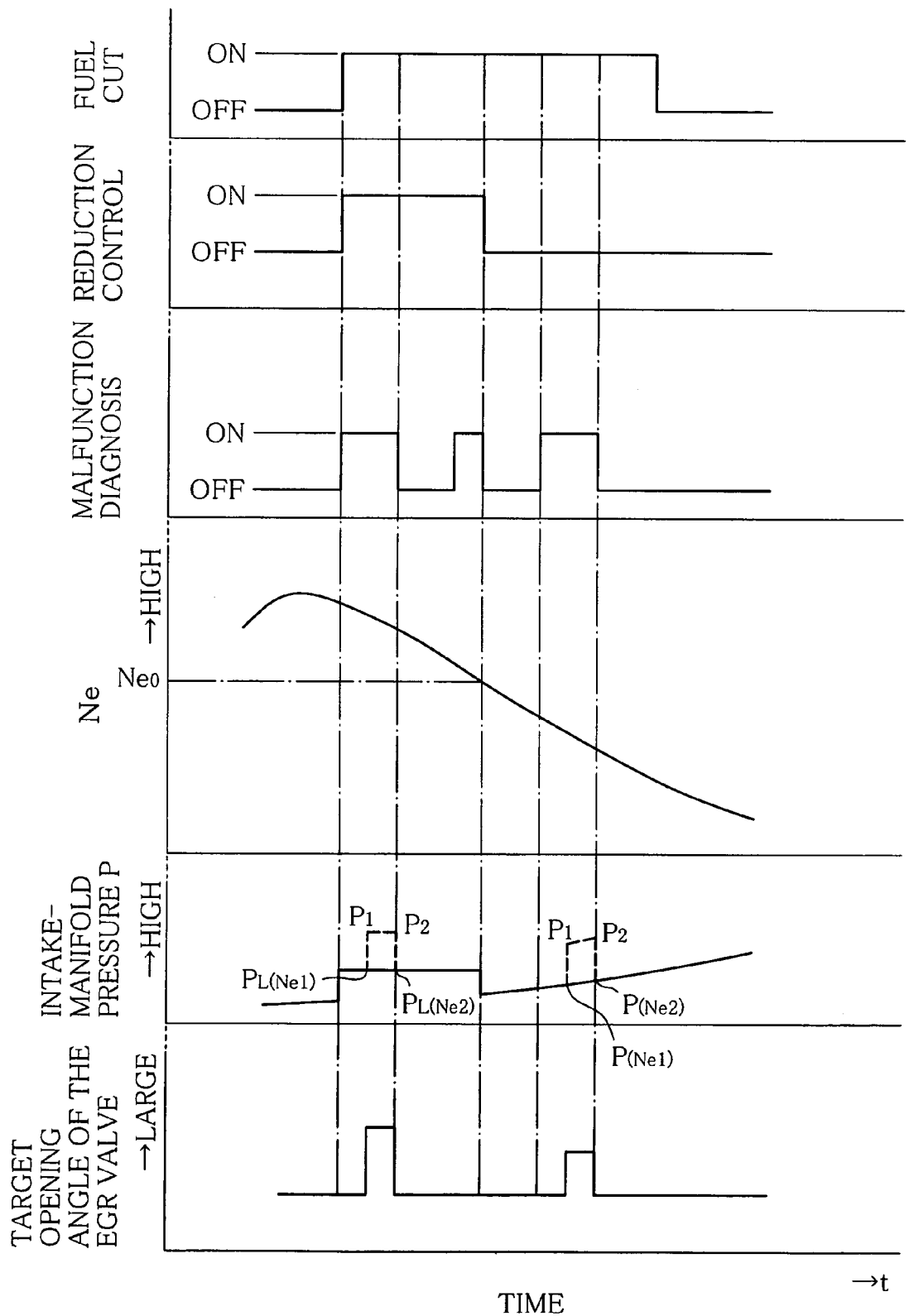
FIG. 8 is a time chart showing one example of a result of the malfunction diagnosis of the EGR apparatus according to the control routine shown in FIG. 2A, 2B.

FIG. 8 shows one example of results of the malfunction diagnosis of the EGR apparatus based upon the control routine in the form of a time chart.

Usually, when the fuel cut is activated, the engine speed Ne is often equal to or more than the given speed Ne0. As shown in FIG. 8, when the fuel cut is started (ON), the control for reducing the intake-manifold negative pressure is simultaneously started (ON). Once the engine speed Ne is reduced to the given speed Ne0, the control for reducing the intake-manifold negative pressure is finished (OFF).

In this case, after the fuel cut is first stated, Steps S30 to S40 are carried out as already described. The EGR valve 24 is opened to reach the target opening angle, and the intake manifold pressures P1 and P2 are measured. At the same time, the reference intake manifold pressures for reduction control $P_L$(Ne1) and $P_L$(Ne2) at the respective time points are read out from the map shown in FIG. 6. The intake-manifold-pressure changing amount ΔP is calculated by the formula (2), and the malfunction diagnosis of the EGR apparatus is carried out (ON). Once the engine speed Ne is reduced to the given speed Ne0, and the control for reducing the intake-manifold negative pressure is finished, the malfunction judgment is suspended. Subsequently, the EGR valve 24 is opened to reach the target opening angle, and the intake manifold pressures P1 and P2 are measured. Meanwhile, the reference intake manifold pressures P(Ne1) and P(Ne2) at the respective time points are read out from the map shown in FIG. 3. The intake-manifold-pressure changing amount ΔP is calculated by the formula (1), and the malfunction diagnosis of the EGR apparatus is carried out (ON).

In the EGR system for an internal combustion engine according to the invention, if the control for reducing the intake-manifold negative pressure is not implemented during fuel cut, the regular reference intake manifold pressure P(Ne) is read out from the map of FIG. 3 to obtain the amount of the spontaneous change in the intake manifold pressure. Based upon the intake-manifold-pressure changing amount ΔP obtained by correcting the amount of the spontaneous change, the malfunction judgment of the EGR apparatus is carried out. If the control for reducing the intake-manifold negative pressure is implemented, the map is switched over, and the reference intake manifold pressure for reduction control $P_L(Ne)$ is read out from the map of FIG. 6, to thereby obtain the amount of the spontaneous change in the intake manifold pressure. The malfunction judgment is made according to the intake-manifold-pressure changing amount ΔP obtained by correcting the amount of the spontaneous change.

Accordingly, the malfunction diagnosis of the EGR apparatus can be accurately carried out. Moreover, whether or not the control for reducing the intake-manifold negative pressure is implemented, that is, regardless of the engine speed Ne, it is possible to sufficiently perform the malfunction diagnosis of the EGR apparatus with high frequency in a wide range between a low-speed zone and a high-speed zone.

When the malfunction diagnosis of the EGR apparatus is carried out, the target opening angle of the EGR valve 24 is determined by the engine speed Ne, and the EGR valve 24 is opened to reach the target opening angle. Therefore, it is possible to maintain the regular intake-manifold-pressure changing amount ΔP to be large and substantially fixed and to enhance the detection of the intake-manifold-pressure changing amount. Consequently, the malfunction diagnosis can be accurately performed without an erroneous judgment.

If the control for reducing the intake-manifold negative pressure is implemented when the malfunction diagnosis of the EGR apparatus is carried out, the malfunction judgment is discontinued in the situation where the difference (Δθ) between {θ−θs(Ne)}max and {θ−θs(Ne)}min is equal to or more than the given amount θa (shown by a dashed line in FIG. 7), which makes the intake manifold pressure unstable. If the difference (Δθ) is smaller than the given amount θa (shown by a broken line), the malfunction judgment is continued. It is therefore possible to prevent a reduction in the opportunity to diagnose a malfunction of the EGR apparatus as much as possible while avoiding an erroneous judgment in the malfunction diagnosis. Consequently, the malfunction diagnosis of the EGR apparatus can be accurately performed with high frequency.

In the transient state where the control for reducing the intake-manifold negative pressure is started or finished, and in the situation where the intake manifold pressure becomes unstable as a result of a drastic change in the opening angle of the ETV 10, the malfunction judgment is discontinued. Therefore, an erroneous judgment of the malfunction diagnosis can be prevented, and the malfunction diagnosis of the EGR apparatus can be carried out with accuracy.

With the EGR system for an internal combustion engine according to the invention, it is possible to maintain the diagnostic accuracy of the EGR apparatus at high level, and to fully satisfy the requirements of the OBD (On Board Diagnosis) system.

This is the end of descriptions about the embodiment of the EGR system for an internal combustion engine according to the invention, but the invention is not limited to the foregoing embodiment.

For instance, in the embodiment, the opening angle restriction of the ETV 10 is reduced by the control for reducing the intake-manifold negative pressure. However, the intake manifold pressure may be adjusted by controlling the operation of the idle speed controller. In this case, the opening changing amount Δθ of the ETV 10 and the given amount θa in Step S46 may be replaced with an operation changing amount of the idle speed controller.

What is claimed is:

1. An EGR system for an internal combustion engine, comprising:
    an intake control valve that is set in an intake path of an internal combustion engine and controls an intake air amount to be introduced into a cylinder by changing opening angle;
    an EGR apparatus having an EGR path that connects an exhaust path of the engine to an intake path located in an intake downstream from the intake control valve and circulates a portion of exhaust gas through the cylinder as EGR gas, and an EGR control valve for controlling a flow rate of EGR gas that flows through the EGR path;
    intake-pressure detecting means that detects intake pressure of the intake path located in the intake downstream from the intake control valve;
    fuel cut means that restricts the opening angle of the intake control valve to a given opening angle and stops fuel supply into the cylinder when the engine is in a deceleration state;
    engine-speed detecting means that detects engine speed;
    reduction control means that reduces the opening angle restriction on the intake control valve according to the engine speed that is detected by the engine-speed detecting means so that the intake pressure of the intake path located in the intake downstream from the intake control valve is not lower than given pressure when the opening angle of the intake control valve is restricted to the given opening angle by the fuel cut means; and
    EGR-malfunction diagnosing means that activates the EGR apparatus to circulate the EGR gas when the opening angle of the intake control valve is restricted to the given opening angle by the fuel cut means, and diagnoses a malfunction of the EGR apparatus according to whether or not the reduction control means is activated, based upon a change in intake pressure before and after the activation of the EGR apparatus, which is detected by the intake-pressure detecting means, and reference intake pressure that is determined in two ways, depending upon whether or not the reduction control means is activated.

2. The EGR system for an internal combustion engine according to claim 1, wherein:
    the EGR-malfunction diagnosing means uses first reference intake pressure as reference intake pressure of a non-activating period of the reduction control means, which is changed according to engine speed when the opening angle of the intake control valve is limited to a given opening angle by the fuel cut means, and the EGR apparatus is not activated; and uses second reference intake pressure as reference intake pressure of an activating period of the reduction control means, which corresponds to a reference opening angle of the intake control valve which is changed according to the engine speed when the opening angle restriction of the intake control valve is reduced by the reduction control means, and the EGR apparatus is not activated; and when the reduction control means is not activated, changing amounts of the intake pressures before and after the activation of the EGR apparatus are corrected with a changing amount of the first reference intake pressure corresponding to a change in engine speed during the above period, and when the reduction control means is activated, changing amounts of the intake pressures before and after the activation of the EGR apparatus are corrected with a changing amount of the second reference intake pressure corresponding to a change in engine speed during the activating period.

3. The EGR system for an internal combustion engine according to claim 1, wherein:

the EGR-malfunction diagnosing means changes a target opening angle of the EGR control valve according to the engine speed when the EGR apparatus is activated.

4. The EGR system for an internal combustion engine according to claim 1, further having:

means for detecting the opening angle of the intake control valve, which detects an actual opening angle of the intake control valve, wherein:

the EGR-malfunction diagnosing means discontinues the malfunction judgment of the EGR apparatus if the actual opening angle of the intake control valve which is detected by the means for detecting the opening angle of the intake valve is changed by a given amount or more during the non-activating period of the reduction control means; and discontinues the malfunction judgment of the EGR apparatus if the difference between the actual opening angle of the intake control valve which is detected by the means for detecting the opening angle of the intake valve and the corresponding reference opening angle is changed by a given amount or more during the activating period of the reduction control means.

5. The EGR system for an internal combustion engine according to claim 1, wherein:

the EGR-malfunction diagnosing means discontinues the malfunction judgment of the EGR apparatus when the non-activating period and the activating period of the reduction control means are switched to each other.

* * * * *